(12) United States Patent  
Oishi

(10) Patent No.: US 6,581,566 B2
(45) Date of Patent: Jun. 24, 2003

(54) AIR INTAKE SYSTEM OF ENGINE

(75) Inventor: Hiroshi Oishi, Tokyo (JP)

(73) Assignee: Fuji Jukogyo Kabushiki Kaisha, Tokyo (JP)

( * ) Notice: Subject to any disclaimer, the term of this patent is extended or adjusted under 35 U.S.C. 154(b) by 60 days.

(21) Appl. No.: 09/863,601

(22) Filed: May 22, 2001

(65) Prior Publication Data

US 2001/0047791 A1 Dec. 6, 2001

(30) Foreign Application Priority Data

May 24, 2000 (JP) ........................................ 2000-152879

(51) Int. Cl.⁷ ................................................ F02B 31/00
(52) U.S. Cl. ....................................................... 123/306
(58) Field of Search ................................. 123/306, 308, 123/301, 432, 339.15

(56) References Cited

U.S. PATENT DOCUMENTS

| 4,323,038 A | * | 4/1982 | Motosugi et al. ....... 123/184.45 |
| 4,484,553 A | * | 11/1984 | Kobayashi et al. ..... 123/339.15 |
| 5,551,392 A | * | 9/1996 | Yamaji et al. ......... 123/188.14 |

FOREIGN PATENT DOCUMENTS

| JP | 63266123 | 2/1988 |
| JP | 5209582 | 8/1993 |

* cited by examiner

Primary Examiner—Mahmoud Gimie
(74) Attorney, Agent, or Firm—Martin A. Farber

(57) ABSTRACT

An intake passage of an internal combustion engine is divided into two intake passages downstream of a throttle valve. A tumble generating valve is disposed in one of these two intake passages. When the engine is stopped, the tumble generating valve is fully closed once and then opens by a specified opening angle. While the engine is inoperative, the tumble generating valve is held at that angle until the engine is started again.

9 Claims, 3 Drawing Sheets

AIR INTAKE SYSTEM OF ENGINE

BACKGROUND OF THE INVENTION

1. Field of the Invention

The present invention relates to an air intake system of an engine and more particularly to an air intake system of an engine having a tumble generating valve for generating tumble stream in a combustion chamber of the engine.

2. Discussion of Related Arts

It is well known that the combustion condition of an internal combustion engine enhances when a tumble stream is generated in a combustion chamber of the engine. When the combustion condition enhances, miscellaneous advantages such as an improvement of startability of an engine, an improvement of exhaust emissions by making a lean mixture condition and the like, are provided.

Japanese Patent Application Laid-open No. Toku-Kai-Hei 5-209582 discloses an air intake system in which an intake port is divided into two parts, a light load port and a heavy load port, by a partition and a tumble generating valve is provided on the heavy load port side. A fuel injector is disposed opposite to the partition such that injected fuel collides against the partition directly and a part of the partition against which fuel collides is shaped in convex and concave so as to enhance atomization of fuel.

The tumble generating valve (hereinafter referred to as TGV) is closed at starting. That is, at starting, in order to enhance startability or to make lean air-fuel mixture, air-fuel mixture is supplied only from the light load port side with the TGV closed so as to generate a tumble stream in the combustion chamber. Further, from the view point of reducing cranking time, it is desirable that the TGV has been closed before the ignition switch is turned on in order to delete time lag necessary for closing the TGV when the ignition switch is turned on. Hence, the TGV is closed when the engine stops and is maintained in a closed condition until the engine is started again.

However, when the TGV is left closed while the engine is in standstill, the engine is cooled down and as a result the TGV is apt to be stained with oil, residues and the like. Further, when temperature is low, the TGV might be frozen by water. As a result, there is a problem that the TGV is stuck due to stains or frozen water.

One solution of this problem is that the TGV is left open when the engine is in standstill. However, since it is necessary to close the TGV once when the engine is started, the starting time is elongated by an operation time (0.5 to 1.0 second) of the TGV from an open to closed condition. This elongation of starting time provides a driver with a bad operational feeling and spoils a customer's satisfaction. Accordingly, the structure of the TGV remaining open can not introduced easily.

SUMMARY OF THE INVENTION

It is an object of the present invention to provide an air intake system having a tumble generating valve (TGV) capable of preventing a faulty operation without spoiling startability of an engine.

To attain the object, an air intake system of an internal combustion engine having an intake passage divided into a first passage and a second passage downstream of a throttle valve and a control valve provided in the first passage for controlling a flow of air comprises an electronic control unit provided to open and hold the control valve at a specified opening angle while the engine is inoperative after the engine is stopped. Also, the electronic control unit of the air intake system is adopted to fully close the control valve before opening the control valve at the specified angle.

DETAILED DESCRIPTION OF PREFERRED EMBODIMENTS

Figure 1:
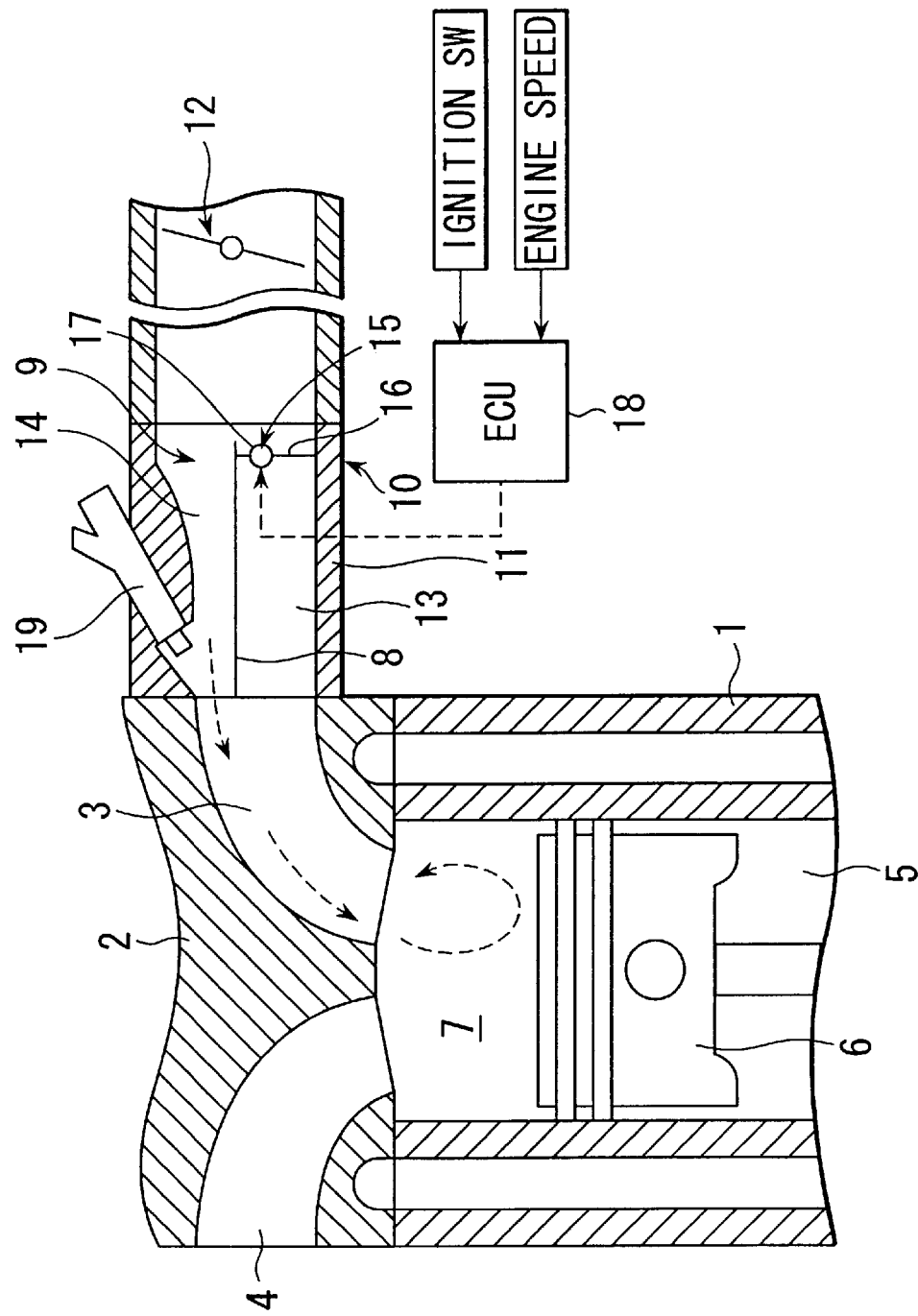
FIG. 1 is a schematic sectional view showing an air intake system of an engine according to an embodiment of the present invention.

Referring now to FIG. 1, reference numeral 1 denotes a cylinder block of an engine and reference numeral 2 denotes a cylinder head in which an intake port 3 and an exhaust port 4 are formed. The intake port 3 and exhaust port 4 are provided with an intake valve (not shown) and an exhaust valve (not shown) respectively. The cylinder block 1 includes a cylinder bore 5 in which a piston 6 is slidably disposed. Further, a combustion chamber 7 is formed by an inner wall of the cylinder bore 5, a top surface of the piston 6 and an undersurface of the cylinder head 2. Further, the intake port 3 is connected at the upstream side thereof with an air intake system 10.

The air intake system 10 has an intake manifold 11 communicating with the intake port 3 and a throttle valve 12 on he upstream side thereof. As shown in FIG. 1, a partition 8 is provided at and part close to the intake port 3 of the intake manifold 11 so as to separate an air intake passage 9 into two passages. That is, a main passage (first passage) 13 and a tumble passage (second passage) 14 are formed in the intake manifold 11.

There is provided a tumble generating valve (TGV) 15 in the main passage 13. The TGV 15 has a valve 16 and a shaft 17 and is controlled by an electronic control unit (ECU) 18. When an opening angle of the TGV is controlled at 0 degree, the main passage 13 is in a closed condition.

The shaft 17 is actuated by a DC motor (not shown). The DC motor is controlled by the ECU 18 which outputs control signals based on an ON-OFF signal of the ignition switch, an engine speed and the like. The shaft 17 is shared with TGVs of other cylinders so as to actuate other TGVs simultaneously when the shaft 17 is driven. Further, the shaft 17 is connected with the DC motor through gears and the like so that the reduced number of rotation of the motor is transmitted to the shaft 17.

On the other hand, the tumble passage 14 is provided with a fuel injector 19. When the TGV 15 is closed and intake air is delivered to the intake port 3 only through the tumble passage 14, a tumble stream is generated in the combustion chamber 7 as shown by a broken line of FIG. 1.

Figure 2:
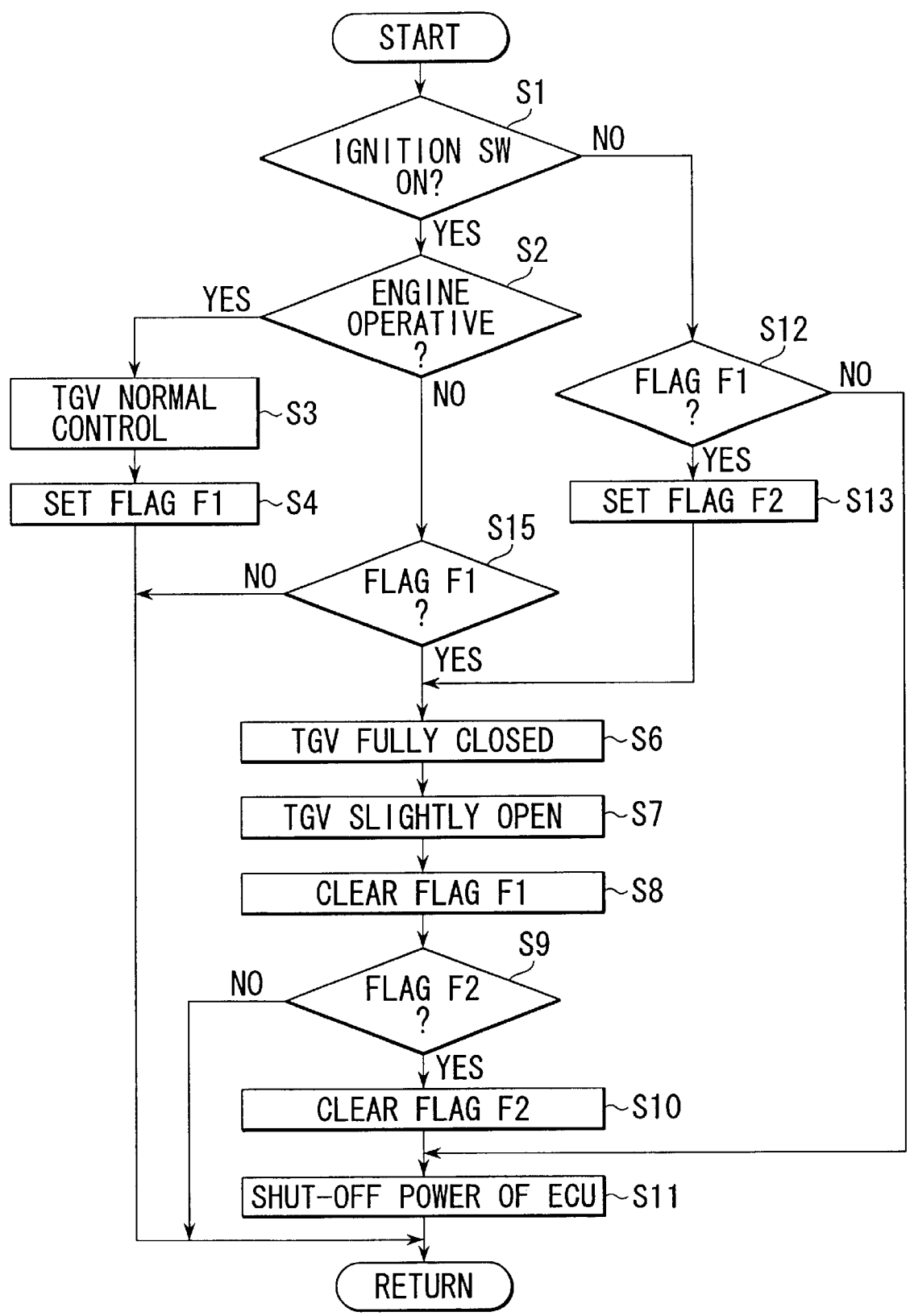
FIG. 2 is a flowchart showing a control strategy of a TGV of the air intake system of FIG. 1 when an engine is stopped.

Next, how to control the TGV 15 of thus constituted air intake system 10 will be described by reference to FIG. 2. First, when the engine is in standstill, the TGV 15 is not completely closed but the valve 16 is held slightly open. That is, when the engine is started, the valve 16 is transferred from a slightly open condition to a fully closed condition.

At a step S1, it is checked whether the ignition switch is turned on or off. Then, in case where the ignition switch is turned on, the program goes to a step S2 where it is checked whether or not the engine is operative. In case where the engine is operative, the program goes to a step S3 where the TGV 15 is normally controlled. Then, the program goes to a step S4 where a flag F1 is set and the program leaves the routine.

On the other hand, in case where it is judged at the step S2 that the engine is not operative, that is, the engine is in standstill, the program goes to a step S5 where the flag F1 is checked. When the engine stalls, since the flag F1 is set, the program goes from the step S5 to a step S6.

At the step S6, the TGV 15 (drive motor) is energized for 1.5 seconds for example to be rendered fully closed once. At this moment, the ECU 18 recognizes this position as 0 degree. Then, the program goes to a step S7 where the TGV 15 is energized in an opening direction for 0.3 seconds for example to be rendered open by 10 degrees. After the TGV 15 is set in a slightly open condition, the program goes to S8 where the flag F1 is cleared. Then, the program goes to a step S9 where a flag F2 which will be described hereinafter is checked.

Since this is not a case where the ignition switch is suddenly turned off while the engine is operative, the flag F1 has not yet set and the program goes from the step S9 directly to RETURN.

After that, at a next routine, when the ignition switch is left on, the program steps from S1 to S2. Since the engine is already stopped and the flag F1 is cleared, the program leaves the routine through the step S5. On the other hand, the ignition switch is turned OFF, the program goes from the step S1 to a step S12. Since the flag F1 has been already cleared, the program goes to a step S11 where the power source of the ECU 18 is shut-off and an execution of the routine is stopped.

In case where the ignition switch is turned off while the engine is operative, there is a very short instant that the engine is in standstill with the ignition switch turned on. Hence, in order to do a series of operation S1, S2, S5, S6 and S7 until the TGV is in the slightly open condition, a very fast processing is needed.

However, it is difficult to require such fast processing from the ECU 18 which must do miscellaneous engine controls. Accordingly, in case where the ignition switch is suddenly turned off, the flag F2 is set after this condition is recognized and the TGV 15 is controlled from a fully closed condition to a slightly open condition while some leeway time is given to the shutting-off of the power source of the ECU 18.

Since the ignition switch is turned off, the program goes from the step S1 to the step S12 where the flag F1 is checked. In this case, since the engine was operative immediately before, the flag F1 which has been set at the step S4 is still remained. On the other hand, in case where the ignition switch has been turned off after the program passed steps S1, S2, S5, S6, S7 and S8, the flag F1 has been cleared. That is, it can be judged by confirming the existence of the flag F1 at the step S12 whether or not the ignition switch has been suddenly turned OFF while the engine is operated.

As a result of confirmation at the step S12, in case where the flag F1 is set, it is judged that the ignition switch is turned off and the program goes to a step S13 where the flag F2 is set. After the flag F2 is set, the program goes to S6 where the TGV 15 is fully closed. Then, the program goes to the step S7 in which the TGV 15 is slightly open and goes to the step S8.

At the step S8, the flag F1 is cleared and the program steps to a step S9.

At the step S9, the flag F2 is checked. In this case, since the flag F2 is set, the program goes to a step S10 where the flag F2 is cleared. Further, the program goes to a step S11 where the power source of the ECU 18 is shut off and then the program leaves the routine. In this case, since the ignition switch is turned off and also the power source of the ECU 18 is shut off, the present routine is finished here.

According to the air intake system 10 of the present invention, the TGV 15 is set to a slightly open condition (opening angle is 10 degrees in this embodiment) and is held in this condition until the engine is started next again. While the engine is in standstill, a small clearance is made between the valve 16 of the TGV 15 and the inner wall of the main passage 13. This small clearance prevents the valve 16 from being stuck or inappropriately operated due to stains and frozen water adhered to surroundings of the valve 16. Accordingly, a faulty operation of the TGV 15 due to stains or frozen water can be prevented without particularly using new devices or members.

Figure 3:
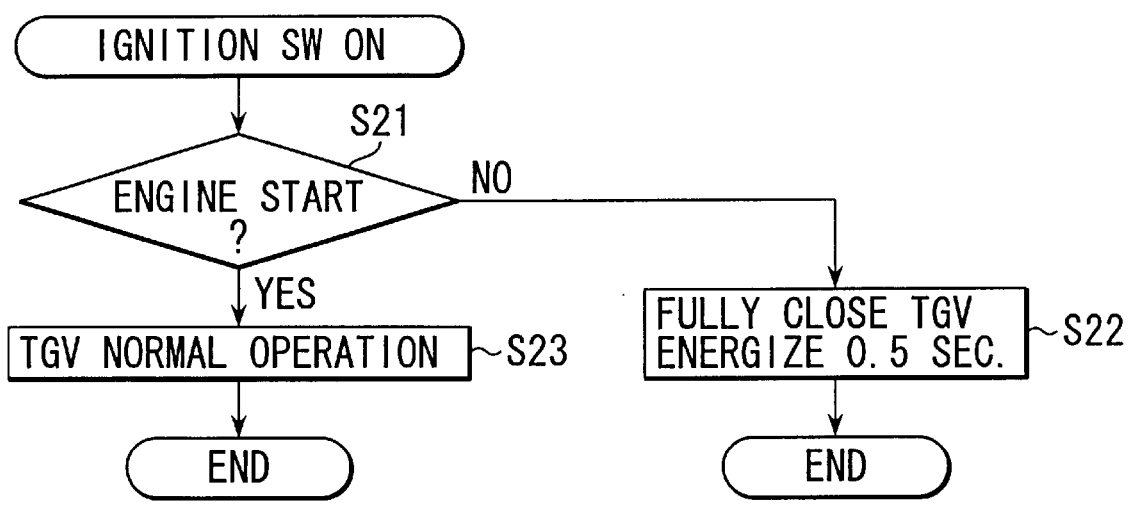
FIG. 3 is a flowchart showing a control strategy of a TGV of the air intake system of FIG. 1 when an engine is stopped.

Next, how to control the TGV 15 at when the engine is started will be described by reference to FIG. 3. As shown in FIG. 3, when the ignition switch is turned on, at a step S21 it is checked whether or not the engine is started. Unless the engine is started, the program goes to a step S22 where the TGV 15 is fully closed and leaves the routine.

That is, the ECU 18 energizes the TGV 15 in a closing direction for 0.5 seconds to fully close the TGV 15 which has been slightly opened by the control when the engine stops previously. At this moment, time needed for fully closing the TGV 15 is very short, about 0.1 to 0.3 seconds. Accordingly, the air intake system 10 using this type TGV can prevents the TGV 15 from being stuck without spoiling startability.

Further, when the TGV 15 is fully closed, the main passage 13 is closed and as a result air is supplied to the intake port 3 only through the tumble passage 14. As a result, a tumble stream is formed in the combustion chamber 7 and startability can be enhanced. On the other hand, when the engine starting is confirmed at the step 21, the program goes to s step S23 where the TGV 15 is controlled in an ordinary manner and leaves the routine.

According to the aforesaid embodiment, the TGV is designed so as to be fully closed once when the engine stops but it is possible to directly place the valve in a slightly open condition.

Further, time energizing the TGV 15 and an valve opening angle in a slightly open condition are not restricted to examples described before. For example, the valve opening angle in a slightly open condition can be established arbitrarily within the scope of not affecting the extension of starting time. However, considering the closing time of the valve, the valve opening angle is preferably less than 15 degrees.

Further, in this embodiment the air intake system incorporating a tumble generating valve (TGV) is described but the present invention may be applied to an air intake system having a swirl control valve (SCV) for generating a swirl stream in the combustion chamber.

While the presently preferred embodiment of the present invention has been shown and described, it is to be understood that this disclosure is for the purpose of illustration and that various changes and modifications may be made without departing from the scope of the invention as set forth in the appended claims.

What is claimed is:

1. An air intake system of an internal combustion engine having, an intake passage connected to an intake port of said engine and divided by a horizontal separation wall into a lower passage and an upper passage downstream thereof, a throttle valve provided upstream of said intake passage for controlling an intake air amount, and a fuel injector inserted in said upper passage for injecting a fuel thereinto, comprising:

a tumble flow generating valve inserted in said lower passage for controlling a tumble flow of said intake air, and an electronic control unit electronically connected to said tumble flow generating valve for controlling an opening thereof to be kept at a predetermined opening angle when said engine is stopped so as to effectively prevent said valve from being stuck without spoiling a startability.

2. The air intake system according to claim 1, wherein:

said electronic control unit controls said tumble flow generating valve to open at said predetermined opening angle after said tumble flow generating valve was fully closed one time.

3. The air intake system according to claim 2, wherein said specified opening angle is preferably less than 15 degrees.

4. The system as recited in claim 1, wherein the tumble flow generating valve is set to a slightly open position and remains in said slightly open position until said engine is started again to prevent said valve from becoming stuck or inappropriately operated.

5. The system as recited in claim 4, wherein the slightly open position is at an angle preferably less than 15 degrees.

6. An air intake valve control method of an internal combustion engine having, an intake passage connected to an intake port of said engine and divided by a horizontal separation wall into a lower passage and an upper passage downstream thereof, a throttle valve provided upstream of said intake passage for controlling an intake air amount, a fuel injector inserted in said upper passage for injecting fuel thereinto, a tumble flow generating valve inserted in said lower passage for controlling a tumble flow of said intake air, an ignition switch for igniting a mixing gas inside a cylinder of said engine, and an electronic control unit electronically connected to said tumble flow generating valve for controlling an opening angle of said tumble flow generating valve, comprising the steps of:

turning said ignition switch off;

opening said tumble flow generating valve at a predetermined opening angle by said electronic control unit when said ignition switch is turned off; and turning said electronic control unit off after said opening angle of said tumble flow generating valve is at a predetermined opening angle.

7. The method as recited in claim 6, wherein the step of opening said tumble flow generating valve, opens said tumble flow generating valve at an angle preferably less than 15 degrees.

8. An air intake valve control method of an internal combustion engine having, an intake passage connected to an intake port of said engine and divided by a horizontal separation wall into a lower passage and an upper passage downstream thereof, a throttle valve provided upstream of said intake passage for controlling an intake air amount, a fuel injector inserted in said upper passage for injecting fuel thereinto, a tumble flow generating valve inserted in said lower passage for controlling a tumble flow of said intake air, an ignition switch for igniting a mixing gas inside a cylinder of said engine, and an electronic control unit electronically connected to said tumble flow generating valve for controlling an opening angle of said tumble flow generating valve, comprising the steps of:

turning said ignition switch of off;

closing fully said tumble flow generating valve one time when said ignition switch is turned off;

opening said tumble flow generating valve at a predetermined opening angle after said tumble flow generating valve was fully closed; and turning said electronic control unit off after said opening angle of said tumble flow generating valve is at a predetermined opening angle.

9. The method as recited in claim 8, wherein the step of opening said tumble flow generating valve after said tumble flow generating valve was fully closed, opens said tumble flow generating valve at an angle preferably less than 15 degrees.

* * * * *